2,879,256
CONTINUOUS PROCESS FOR PREPARING VINYL OR VINYLIDENE CHLORIDE GRAFT POLYMERS OF IMPROVED SOLUBILITY

Willis C. Wooten, Jr., and Donald J. Shields, Kingsport, Tenn., assignors to Eastman Kodak Company, Rochester, N.Y., a corporation of New Jersey No Drawing. Application November 26, 1954
Serial No. 471,498

4 Claims. (Cl. 260—45.5)

This invention relates to the preparation of graft polymers of a vinyl or vinylidene chloride monomer and is particularly concerned with continuous processes for preparing such graft polymers of improved solubility characteristics.

Graft polymers are prepared by polymerizing together monomeric material and a preformed homopolymer or copolymer to give a composite unitary polymer which has a higher softening point than copolymers alone and increased compatibility with other homopolymers or copolymers in solutions in a suitable solvent. The graft polymers are also characterized by greatly improved dyeability, moisture absorption, elongation and tensile characteristics, and thus are particularly suited for use in the manufacture of synthetic fibers. Unlike the usual polymer mixtures employed to obtain specific properties, the graft polymers show no tendency toward separation in solution and are not subject to longitudinal segmentation in fiber form.

A particularly useful class of graft polymers are those formed from either vinyl chloride or vinylidene chloride or a mixture thereof, employed either as the grafting monomer material which is polymerized with the preformed polymer or to form the preformed polymer in the reverse process. These chloride graft polymers form excellent textile fibers, which, in the range of 30–100% by weight of the chloride monomer based on the total monomer used in the polymerizing step including the chloride monomer, exhibit non-inflammability characteristics which make them especially advantageous for use in the manufacture of textiles. The graft polymers embodying the invention are those wherein 5–95% by weight of a preformed polymer (A) and 95–5% by weight of monomeric material (B) are graft polymerized to form a unitary polymer. Either the polymer (A) or the monomeric material (B) used in effecting the graft polymerization consists of 15–100% by weight of vinyl and/or vinylidene chloride and 85–0% of another monoethylenically-unsaturated polymerizable monomer containing a

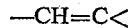

group, and desirably a $$CH_2=C<$$

group. The other of the materials (A) or (B) then consists of either a homopolymer of a modifier which can be an acrylamide, maleamide, fumaramide, itaconamide, citraconamide, maleamate, fumaramate, itaconamate, citraconamate, acrylate, or vinyl ester monomer as hereinafter defined or an interpolymer of 1–99% by weight of such a modifier with 99–1% by weight of another such modifier or a different monoethylenically-unsaturated polymerizable monomer characterized by a

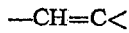

group when the chloride component is the monomeric material (B) or the corresponding monomer or monomers when the chloride component is the preformed polymer (A). The graft polymers which are prepared in accordance with this invention can include any of such polymers, whether prepared from a preformed polymer which has been isolated from the medium in which it was polymerized (i.e. a "dead" polymer) or from a preformed polymer which is still in the medium in which it was polymerized (i.e. a "live" polymer).

A large number of such vinyl or vinylidene chloride graft polymers are disclosed in the applications of Harry W. Coover, Jr., Serial Nos. 471,501, 471,502, and 471,503, filed concurrently herewith, and this invention is concerned with an improved process for preparing any of the vinyl or vinylidene chloride polymers disclosed in such copending applications to give polymers of controlled solubility characteristics. Such modified vinyl or vinylidene chloride polymers can be dissolved in such solvents as N,N-dimethylformamide, N,N-dimethylacetamide, ethylene carbonate, ethylene carbamate, γ-butyrolactone, and N-methyl-2-pyrrolidone to give filterable smooth dopes which can be spun by wet or dry spinning methods. It is desirable, however, to be able to prepare graft polymers of improved solubility characteristics whereby more common solvents such as acetone or the like can be used in preparing dopes. Such solvents as acetone are more economical to use and pose fewer recovery and handling problems. Furthermore, when acetone soluble polymers are obtained, it is possible to utilize equipment which is suitable for use for spinning cellulose acetate fibers and similar acetone-soluble fibers. This increased versatility is of great commercial significance. Furthermore, it is desirable to be able to control the solubility characteristics as desired according to a predetermined plan.

In the discontinuous or batch-type processes, it was difficult to improve the solubility characteristics of the chloride graft polymers except by lowering the conversion percentage which is undesirable in many cases from the commercial standpoint in that the product yield for the reactor capacity is thereby lowered. Consequently, it is desirable to operate at high conversions, e.g. 90% or more, and still obtain the improved solubility characteristics.

Another difficulty encountered in batch processes, aside from the inherent disadvantages with regard to equipment, manpower, etc., is that the polymerizations, and particularly the free radical catalyzed polymerizations, usually exhibit an induction period before polymer formation is evidenced. The induction period appears to vary, even under carefully controlled conditions, and affects the molecular weight distribution of the polymer and hence the solubility and physical properties of the polymer.

Another disadvantage of the batch processes is the rapid evolution of heat by the large quantities of reactants which makes it almost impossible, even with efficient cooling, to hold a constant temperature during the course of the polymerization. In large scale commercial production, this imposes a limit on the speed with which the polymerization can be carried out. Furthermore, certain amide modifiers, which are among the most useful for graft polymer formation, exhibit an inverse solubility in water and decrease in solubility as the temperature increases. Thus, most graft polymerizations with amide type modifiers, and particularly the acrylamide modifiers, must be carried out below the temperature at which the amide polymers become insoluble. If, as in a batch reaction, the temperature control is inadequate, the precipitation temperature of the preformed polymer is sometimes exceeded and discrete particles of the preformed polymer form and persist in the product. Accordingly, a nonhomogeneous composition distribution results with particles of ungrafted polymer present, and the properties of the product resemble that of a mechanical mixture.

A further disadvantage of batch processes is that usually the monomers employed vary somewhat in reactivity and rate of polymerization. Consequently, the relative proportions of the reactants is constantly changing during the polymerization and the composition distribution of the product is also changing. The first polymer formed tends to be relatively rich in the more reactive component and later polymer is progressively richer in the less reactive component. This, of course, results in non-uniform properties and is particularly serious when one of the components is introduced in a relatively small amount. Furthermore, the concentration of other ingredients also varies during the polymerization and hence the molecular weight of polymer being formed varies throughout the course of the reaction.

It is accordingly an object of this invention to prepare improved graft polymers containing a substantial amount of vinyl or vinylidene chloride by processes which make possible the control of the solubility characteristics of the product.

It is also an object of the invention to provide an improved process for grafting monomeric material including at least 15% by weight of vinyl and/or vinylidene chloride with a preformed live or dead homopolymer or copolymer of a modifier so as to greatly improve the solubility characteristics of the product over those obtained by conventional batch processes employing the same reactants in the same relative proportions.

Another object of the invention is to provide chloride graft polymers of improved utility for the manufacture of synthetic fibers, and particularly to provide graft polymers of vinyl and/or vinylidene chloride capable of forming spinnable dopes in common organic solvents, such as acetone, and capable of being wet or dry spun from such dopes into synthetic fibers of good strength, elongation, dyeability, moisture absorption and non-inflammability by processes and employing equipment already well known in the art.

Another object of the invention is to prepare modified vinyl and/or vinylidene chloride polymers by continuous processes which obviate or reduce to an unobjectionable degree the disadvantages inherent in batch-type processes, such as objectionable induction periods with the resultant difficulties in control of product composition, rapid heat evolution from large bodies of reactants with the consequent nonuniformity of temperature during the course of the polymerization and the danger of precipitation of ungrafted polymer to give nonuniform composition distribution, changes in the relative proportions of the reactants during the polymerization with the resultant progressive change in composition of product, and the progressive change in molecular weight distribution in the product with the accompanying deleterious effect on physical and chemical properties of the polymer.

Another object of the invention is to facilitate the commercial production of vinyl or vinylidene chloride graft polymers, particularly acetone-soluble fiber-forming polymers.

Other objects will be apparent from the description and claims which follow.

These and other objects are attained by means of this invention as described in detail hereinafter and wherein the improved vinyl or vinylidene chloride graft polymers of controlled solubility characteristics are prepared by a continuous equilibrium or steady-state process wherein essentially uniform polymers are continuously produced and withdrawn without change in the relative proportions of any of the ingredients of the polymerization mixture at either high, low or intermediate conversions and any desired ratio of the polymerizable reactants within the range of 5–95% by weight of preformed polymer and 95–5% by weight of the monomeric material polymerized therewith.

In practicing the invention, the reactants employed are usually the same as are used in corresponding batch reactions and include preformed polymer, grafting monomer or monomer mixture, polymerization catalyst and polymerization medium, with or without the concomitant use of activator, emulsifier, chain regulator and such other adjuvants as are commonly employed in polymerization practice. The various reactants and adjuvants are all continuously added to the polymerization system at controlled rates and in predetermined proportions depending upon the polymer composition desired. Polymerization in each increment of additive begins at once. When the continuous process is initiated, all of the components are added simultaneously and continuously at a specific rate which is thereafter maintained. During the initial stages of the process, product is not withdrawn until the volume of polymerization mixture has been built up to the desired capacity. The time between the addition of the first increment of components and the withdrawal of the first increment of product from the system is defined as the contact time and can be varied as desired depending upon the degree of conversion and the molecular weight of product desired. Product is then progressively withdrawn from the polymerization system in the form of an emulsion at a rate corresponding to the rate of addition of the reaction components. Consequently, each increment of the reaction mixture is present under identical reaction conditions for exactly the same time as any other increment. Furthermore, since all of the components of the reaction mixture are being continuously added, the relative concentrations in the system do not change and the entire polymerization proceeds at equilibrium or in a steady state, and the product does not vary to any appreciable extent regardless of the length of time the process is carried on. One of the outstanding and unique features of this continuous equilibrium process is that differences in monomer polymerization rates have no effect whatever on the choice of polymer compositions or the uniformity of such polymer compositions. The monomer polymerization rates affect only the relationship of polymer composition to monomer feed rates at equilibrium; and, since the mnomer feed rates can be adjusted to any desired value, polymer of any desired composition can be formed regardless of the relative polymerization rates of the monomers.

Quite unexpectedly, the chloride graft polymers prepared by the continuous process embodying the invention have greatly improved solubility characteristics even at high conversions where the batch process polymers are poorly soluble if soluble at all in many of the common organic solvents. Furthermore, even at low conversions of the order of 50–70% where batch process polymers have somewhat improved solubility, the graft polymers produced in accordance with this invention are superior in physical properties. This solubility of the modified vinyl chloride and vinylidene chloride graft polymers in such materials as acetone is particularly surprising because such polymers are well known to be difficultly soluble. Thus, even the vinyl chloride homopolymers and copolymers which are ordinarily much more soluble than the vinylidene chloride polymers, have been the subject of intensive work in the art to obtain acetone solubility. In the case of the vinyl chloride polymers various devices were used to achieve acetone solubility, but they were all difficult or uneconomical to use in commercial production. Thus, for example, Pitzl, U.S. 2,606,894, achieves ready solubility of 90% vinylidene chloride-10% acrylonitrile copolymers only by employing specific ratios of ammonium persulfate catalyst to sodium metabisulfite activator and stopping the polymerization at 55–70% conversion. Similarly, Ham, U.S. 2,610,173, discloses that improved solubility can be obtained only by carrying out the copolymerization at constant reflux temperature with continuous addition of monomers at rates which are varied to keep the mixture refluxing at constant temperature. Others achieved solubility by continuous addition of monomer at constantly varying rates requiring close control of the conditions and continuous following of the polymer composition.

In contrast to these processes for preparing simple vinyl chloride or vinylidene chloride homopolymers or copolymers (but not graft polymerization), the process embodying this invention merely involves adding all of the components including preformed polymer, monomer or monomers, catalyst and such other polymerization aids as are desired at predetermined constant rates with the rate of product withdrawal also being constant and correlated to the rate of addition. In the stationary state system embodying this invention, the relative ratios of preformed polymer, monomer or monomers, water and catalyst are uniform indefinitely, but the ratios chosen can be varied infinitely and the monomers do not have to be added or removed differentially. Thus the system is always at equilibrium, although the point of equilibrium can be chosen as desired, since, for example, the contact time can vary from 30 minutes to 24 hours or longer but is desirably of the order of about six hours or such time as the conversion is of the order of 90% or more. By a suitable choice of the ratio of monomers and polymers, any given polymer composition can be obtained since the composition of the product will not deviate from the ratio of the reactants by more than 5%.

The processes embodying the invention can be effected employing the chloride component (i.e. the vinyl chloride and/or vinylidene chloride with or without another copolymerizable ethenoid monomer) either in the form of the grafting monomers, which is preferable, or to form the preformed polymer (reverse process). Conversely, the modifier as defined herein can be employed alone or in a combination of two or more of such modifiers or in a combination of such a modifier with a different polymerizable monoethenoid monomer; and such modifier component (i.e. the modifier alone or with another ethenoid monomer) can be employed to form the preformed polymer, as is preferred, or can be used as the monomeric material in the grafting step (reverse process). The preformed polymer can be an isolated polymer, that is, one which has been separated from its polymerization medium and then redispersed (i.e. either dissolved or emulsified) for use in the grafting step. Preferably, however, the preformed polymer is maintained in the mixture in which it was polymerized as a live polymer whereby higher softening products are obtained than with the isolated or dead polymers. Although vinyl and/or vinylidene chloride can be employed alone as the chloride component, it is often desirable to employ another ethenoid monomer therewith whereby enhanced tensile and elongation characteristics are obtained without an objectionable lowering in the softening point.

For simplicity, the practice of the invention is described with particular reference to the use of the modifier component as the preformed polymer and the chloride component as the grafting monomer or monomers, but it will be understood that the considerations set out are likewise applicable to the reverse process. If desired, the preformed polymer, particularly when employed as a live polymer, can be produced continuously and fed to the continuous grafting process directly, or it can be formed batchwise and stored for use as needed.

The continuous equilibrium grafting process of this invention is desirably carried out in aqueous medium but can be advantageously carried in other reaction media in some cases such as organic solvents or mixtures of water and a water-soluble solvent such as acetone. Anhydrous solvents which are suitable include acetonitrile, benzene, toluene, liquid alkanes such as n-heptane and the like, aliphatic ethers, acetone, and similar well known solvents. The polymerization is effected in a dispersion, and, as used herein, the term dispersion is intended to include both true solutions and emulsions. The processes embodying the invention are particularly suitable for preparing graft polymers wherein 60–95% of the polymer consists of the chloride component and 40–5% of the polymer consists of the modifier component, with the chloride monomer (i.e. vinyl chloride and/or vinylidene chloride) forming 15–100% and preferably 30–100% of the chloride component. Such polymers are particularly useful for making synthetic fibers, and the polymers containing at least 30% by weight of chloride monomer have the added advantage of being non-inflammable. The polymers containing 5–60% by weight of chloride component are also useful particularly for forming mixtures with simple polymers or interpolymers containing at least 85% by weight of vinyl chloride or vinylidene chloride, such mixtures being wholly compatible and showing no tendency toward phase separation. Alternatively, the graft polymers containing 5–60% by weight of the chloride component can be admixed with additional monomeric vinyl chloride or vinylidene chloride, and polymerization effected until the product contains at least 60% by weight of polymermized chloride monomer.

The polymerizations are accelerated by heat, by actinic light such as ultraviolet light and polymerization catalysts. Such catalysts are commonly used in the art of polymerization, and our invention is not to be limited to any particular catalyst material. Catalysts which have been found to be especially useful comprise the peroxide polymerization catalysts such as the organic peroxides e.g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates etc., hydrogen peroxide, perborates e.g. alkali metal perborates such as sodium and potassium perborates, ammonium perborate, etc., per sulfates e.g. alkali metal persulfates such as sodium and potassium persulfates, ammonium persulfate, etc. Other catalysts such as ketazines, azines, etc. can also be used. Mixtures of catalysts can be employed. The amount of catalyst can be varied depending on the monomer, amount of diluent, etc. The temperature at which the continuous polymerizations can be carried out is not critical. Generally, however, a temperature of from 15° to 75° C. is efficacious.

If desired, emulsifying agents can be added to the reaction mixture to distribute uniformly the reactants throughout the reaction medium. Typical emulsifying agents include the alkali metal salts of certain alkyl acid sulfates e.g. sodium lauryl sulfate, alkali metal salts of aromatic sulfonic acids such as sodium isobutyl naphthalenesulfonate, alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers e.g. aryloxy polyalkylene ether sulfonates such as Triton 720, etc. The polymerizations can advantageously be carried out also in the presence of chain regulators such as hexyl, octyl, lauryl, dodecyl, myristyl mercaptans, etc., which impart solubility properties to the polymer compositions. If desired, an activating agent such as an alkali metal sulfite e.g. sodium, potassium, etc. sulfites, bisulfites and metabisulfites can be added in about the same amount as the polymerization catalyst.

In effecting the continuous process of the invention, the chloride monomer, other ethenoid grafting monomer, if any, preformed polymer in its original polymerization medium or redispersed in a suitable reaction medium, catalyst, activator if any, etc. can be stored separately and introduced separately but continuously into the polymerization system which can be a stirred reactor of the type usually employed for batch processing but provided with means for continuously withdrawing polymer emulsion or slurry from the reaction zone. In the preferred process, an emulsifier is included with the preformed polymer. If desired, of course, the monomers can be combined and in some cases it may even be desirable to premix the monomers and preformed polymer in the desired ratio and continuously feed the resulting admixture to the reaction zone. The polymerization can be carried out in several successive stages but best results from the standpoint of uniformity and solubility of product are obtained using but a single reaction stage.

The practice of the invention is illustrated by the following examples, it being understood that the process is equally applicable to the manufacture of any of the other modified vinyl and/or vinylidene chloride graft polymers as defined herein. Since the nature and proportions of the reactants does not change the reaction conditions as described, the invention is not limited by the examples unless otherwise specifically indicated.

*Example 1*

In a typical continuous equilibrium process embodying the invention, vinylidene chloride monomer (A), acrylonitrile monomer (B), a 1% aqueous solution (C) of potassium persulfate, and a dispersion (D) of 100 parts by weight of water containing 2 parts by weight of an isolated N-isopropylacrylamide-2-methyl-5-vinyl pyridine copolymer together with 1 part by weight of dioctyl sodium sulfosuccinate (Aerosol OT) and 0.1 part by weight of potassium metabisulfite were stored separately and added continuously to a reactor at such rates that the relative ratios by weight of materials entering the reactor were 1.0 (A):1.0 (B):0.5 (C):24.0 (D). The materials admixed in the reactor were agitated vigorously and the temperature was held constant at 25° C. Polymerization ensued almost immediately on admixture of the first increment of reactants and continued with the continuous addition. The contact time, that is the time between introduction of any increment to the reactor and its withdrawal as product, is in practice the volume of the reactor divided by the rate of introduction of the ingredients. Since, at equilibrium, the polymer emulsion or slurry is removed from the reactor at the same total rate as the ingredients are being added, the contact time is conveniently controlled by the absolute rate of addition of the reactants. Thus, the contact time can be varied infinitely depending upon the rate of addition chosen. An especially useful contact period was about 6 hours, at which time titration for residual acrylonitrile monomer indicated that a conversion to polymer of 90% had occurred. Thus, the rate of addition in the preferred process was chosen so that with continuous addition of the ingredients in the ratio set out, the reactor filled in 6 hours at which time continuous withdrawal of polymer emulsion was begun at the same rate as the total rate of addition of the reaction ingredients. The polymeric product removed was then isolated, a particularly convenient method being to heat the emulsion above its precipitation temperature or to about 60–70° C. and filtering out the resultant precipitated product. Thus, throughout the process, the polymerization proceeded in an equilibrium or stationary state wherein the ratio of all of the ingredients remained unchanged. The process could be continued indefinitely without any change in polymer uniformity and with no control being necessary beyond maintaining the rates of addition and withdrawal constant. The graft polymer product, which could be isolated by any of the usual methods, was soluble in acetone and stayed in solution at room temperature at spinning dope concentrations of 15–20% solids, which was in marked contrast to graft polymers of the same composition but prepared by batch processes which were not soluble in acetone. Spinning dopes of the polymer were dry spun into fibers having a tenacity of 3 g. per denier, a softening point of 190° C. and a high affinity for most classes of dyes.

Improved solubilities in various solvents were obtained with all of the compositions within the ranges herein defined. Acetone solubility was obtained with compositions containing 60–95% of chloride component and 40–5% of modifier component over the range of 25–65% of chloride monomer using any of the modifiers and copolymerizable ethenoid monomers as described herein. Improved solubilities in all of the solvents commonly employed was obtained over the entire range of 15–100% chloride monomer based on the chloride component. The improved results were also obtained with either dead or live homopolymers or copolymers as described herein, and it is thus apparent that the invention is applicable for the preparation of any of the graft polymers containing 5–95% by weight of modifier component containing 1–100% by weight of polymerized modifier monomer and 99–0% by weight of a different polymerizable monoethylenic monomer, and 95–5% by weight of chloride component containing at least 15–100% by weight of polymerized chloride monomer which can be vinyl chloride and/or vinylidene chloride and not more than 85–0% by weight of a monoethenoid monomer which can be any of the modifier monomers or other monoethylenically unsaturated polymerizable monomers as described herein but which is desirably either acrylonitrile or methacrylonitrile.

*Example 2*

Vinyl chloride (A), acrylonitrile (B), a 1% aqueous solution (C) of potassium persulfate, and a dispersion (D) of 2 parts of N-isopropyl acrylamide-2-methyl-5-vinyl pyridine copolymer, 1 part of sodium octyl sulfate, and 0.1 part of potassium metabisulfite in 100 parts of water were continuously added to a stirred reactor in a weight ratio of 0.6 (A):1.4 (B):0.5 (C):12.0 (D). The temperature of the resulting mixture was maintained at 25° C. and the rate of addition of the materials A–D was set to give a contact time of about 24 hours, at which time a titration for residual acrylonitrile indicated a conversion to polymer of about 90% was occurring. Thereupon, the polymer emulsion was withdrawn at the same rate as the combined rate of addition of the various ingredients. The resultant graft polymer product, after isolation by the usual methods, was dry spun into fiber. The resulting fibers after drafting, relaxing and stabilization in accordance with usual practice had a tenacity of 2.8 g. per denier, an extensibility of 30% and a high affinity for most classes of dyes such as cellulose acetate dyes. The fibers were non-inflammable and were of excellent utility for the manufacture of textiles of any desired color or shade.

In practicing the invention, the acrylamides such as N-isopropylacrylamide and N-methyl methacrylamide are preferably employed as the modifier either alone or in combination with another ethenoid monomer such as a vinyl pyridine, acrylonitrile, methacrylonitrile, a vinyl ester such as vinyl acetate, styrene or a polymerizable derivative thereof or other well known ethenoid monomer, with the modifier components consisting of 50–100% of an acrylamide and 50–0% of such other monomer being preferred. Highly useful results are obtained with any of the other modifiers as set out hereinafter, however, and with other monoethylenic monomers used in combination with either the modifier or the chloride monomer or both.

Thus, the modifiers can include any of the acrylamides, maleamides, fumaramides, itaconamides, citraconamides, maleamates, fumaramates, citraconamates, itaconamates, acrylates and vinyl esters, particularly as illustrated hereinafter with reference to typical modifiers which are suitable. Likewise the monoethylenically unsaturated polymerizable monomer which can be employed in conjunction with either or both of the modifier and the chloride monomer can be any ethenoid monomer containing a single

—CH=C< group.

The acrylamides whose polymers can be advantageously used in our invention contain from 3 to 12 carbon atoms and comprise those represented by the following general formula:

I
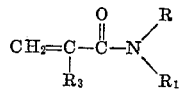

wherein R and $R_1$ each represents a hydrogen atom or alkyl group containing from 1 to 4 carbon atoms (e. g. methyl, ethyl, propyl, isopropyl, butyl, isobutyl, etc. groups) and $R_3$ represents a hydrogen atom or a methyl group. Typical acrylamides include acrylamide, N-methyl acrylamide, N-ethyl acrylamide, N-isopropyl acrylamide, N-n-butyl acrylamide, methacrylamide, N-methyl methacrylamide, N-ethyl methacrylamide, N-isopropyl methacrylamide, N,N-dimethyl acrylamide, N,N-diethyl acrylamide, N,N-dimethyl methacrylamide, etc. N-cyclohexylacrylamides can also be used.

As maleamides, we can advantageously use those containing from 4 to 20 carbon atoms represented by the following general formula:

II
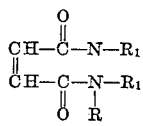

wherein R and $R_1$ are as above defined. Typical maleamides include maleamide, N-methyl maleamide, N-ethyl maleamide, N-propyl maleamide, N-isopropyl maleamide, N-n-butyl maleamide, N,N'-dimethyl maleamide, N,N'-diethyl maleamide, N,N'-di-n-butyl maleamide, N-methyl-N'-ethyl maleamide, N,N'-tetramethyl maleamide, N,N'-tetraethyl maleamide, N,N-dimethyl-N',N'-diethyl maleamide, etc.

As fumaramides, we can advantageously use those containing 4 to 20 carbon atoms represented by the following general formula:

III
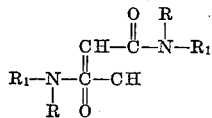

wherein R and $R_1$ are as above defined. Typical fumaramides include fumaramide, N-methyl fumaramide, N-ethyl fumaramide, N-propyl fumaramide, N-isopropyl fumaramide, N-n-butyl fumaramide, N,N'-dimethyl fumaramide, N,N'-diethyl fumaramide, N,N'-di-n-butyl fumaramide, N-methyl-N'-ethyl fumaramide, N-methyl-N'-butylfumaramide, N,N'-tetramethyl fumaramide, N,N'-tetraethyl fumaramide, N,N-dimethyl-N',N'-diethyl fumaramide, etc.

As itaconamides, we can advantageously use those containing from 5 to 21 carbon atoms represented by the following general formula:

IV
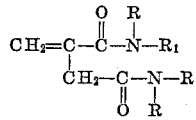

wherein R and $R_1$ are as above defined. Typical itaconamides include itaconamide, N-methyl itaconamide, N-ethyl itaconamide, N-n-butyl itaconamide, N,N'-dimethyl itaconamide, N,N'-diethyl itaconamide, the N,N'-butyl itaconamides, N,N'-tetramethyl itaconamide, etc.

As citraconamides, we can advantageously use those containing from 5 to 21 carbon atoms represented by the following general formula:

V
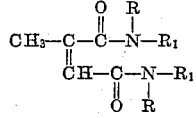

wherein R and $R_1$ are as above defined. Typical citraconamides include citraconamide, N-methyl citraconamide, N-ethyl citraconamide, N-n-butyl citraconamide, N,N'-dimethyl citraconamide, N,N'-diethyl citraconamide, the N,N'-butyl citraconamides, N,N'-tetramethyl citraconamide, etc.

The maleamates whose polymers we can advantageously use comprise those containing from 5 to 16 carbon atoms represented by the following general formula:

VI
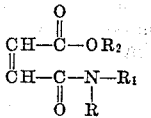

wherein R and $R_1$ are as above defined and $R_2$ represents an alkyl group containing from 1 to 4 carbon atoms. Typical maleamates include methyl maleamate, ethyl maleamate, propyl maleamate, n-butyl maleamate, N-methyl methyl maleamate, N-ethyl methyl maleamate, the N-butyl methyl maleamates, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, we can advantageously use those containing from 5 to 16 carbon atoms represented by the following general formula:

VII
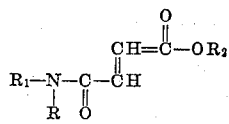

wherein R, $R_1$ and $R_2$ are as above defined. Typical fumaramates include methyl fumaramate, ethyl fumaramate, propyl fumaramate, n-butyl fumaramate, N-methyl methyl fumaramate, N-methyl ethyl fumaramate, the N-methyl butyl fumaramates, N-dimethyl methyl fumaramate, N-dimethyl ethyl fumaramate, N-dimethyl n-butyl fumaramate, the N-dibutyl methyl fumaramates, etc.

As itaconamates, we can advantageously use those containing from 6 to 17 carbon atoms represented by the following general formulas:

VIII
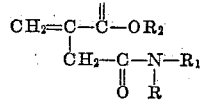

and

IX
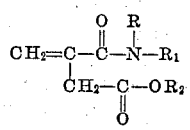

wherein R, $R_1$ and $R_2$ are as above defined. Typical itaconamates include methyl itaconamate, ethyl itaconamate, propyl itaconamate, the butyl itaconamates, N-methyl methyl itaconamate, N-methyl ethyl itaconamate, N-methyl propyl itaconamate, N-methyl n-butyl itaconamate, N-dimethyl methyl itaconamate, N-dimethyl ethyl itaconamate, N-dimethyl n-butyl itaconamate, the N-dibutyl methyl itaconamate, etc.

As citraconamates, we can advantageously use those containing from 6 to 17 carbon atoms represented by the following general formulas:

X
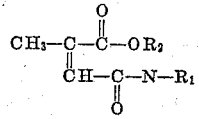

and

XI
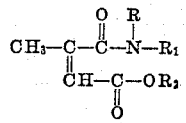

wherein R, $R_1$ and $R_2$ are as above defined. Typical citraconamates include methyl citraconamate, ethyl citraconamate, propyl citraconamate, the butyl citraconamates, N-methyl methyl citraconamate, N-methyl ethyl citraconamate, N-methyl propyl citraconamate, N-methyl n-butyl citraconamate, N-dimethyl methyl citraconamate, N-dimethyl ethyl citraconamate, N-dimethyl n-butyl citraconamate, the N-dibutyl methyl citraconamates, etc.

The acrylates whose polymers we can advantageously use comprise those containing from 4 to 8 carbon atoms represented by the following general formula:

XII
$$CH_2=C(R_3)-C(=O)-OR_2$$

wherein $R_2$ and $R_3$ are as above defined. Typical esters include methyl acrylate, ethyl acrylate, propyl acrylate, n-butyl acrylate, isobutyl acrylate, methyl methacrylate, ethyl methacrylate, propyl methacrylate, the butyl methacrylates, etc.

As vinyl carboxylic esters we can advantageously use those containing from 4 to 6 carbon atoms represented by the following general formula:

XIII
$$CH_2=CH-O-C(=O)-R_4$$

wherein $R_4$ represents an alkyl group containing from 1 to 3 carbon atoms. Typical esters include vinyl formate, vinyl acetate, vinyl propionate, vinyl butyrate, etc.

Any of these modifiers can be used in practicing the invention either alone or in a mixture of two or more of such monomers of the Formulas I–XIII, or in admixture with one or more different monoethylenically unsaturated polymerizable monomers containing a $$-CH=C<$$

group and desirably a $$CH_2=C<$$

group. The chloride monomer can similarly be employed alone or in admixture with another monoethylenically unsaturated polymerizable monomer containing a $$-CH=C<$$

group, and this term is therefore used herein to include any of the compounds represented by Formulas I through XIII in addition to such other monomeric materials as the vinyl pyridines typified by 2-vinyl pyridine, 4-vinyl pyridine, and 2-methyl-5-vinyl pyridine, styrene monomers such as styrene itself, α-methyl-styrene, p-acetaminostyrene, α-acetoxystyrene and the like, acrylonitrile monomers such as acrylonitrile, methacrylonitrile, acetoxyacrylonitrile and the like, vinyl ethers such as ethyl vinyl ether, isopropyl vinyl ether and the like, vinylic ketones such as isopropenyl methyl ketone, ethyl isopropenyl ketone, methyl vinyl ketone, ethyl vinyl ketone and the like, alkyl diesters of unsaturated acids such as dimethyl maleate, diethyl maleate, diisopropyl maleate, dimethyl fumarate, diethyl fumarate, diisopropyl fumarate and the like, vinylic hydrocarbons such as ethylene, isobutylene and the like, polymerizable vinylic acids such as acrylic acid, methacrylic acid and the like, fumaronitrile, N-vinyl phthalimide, vinyl sulfonamide and similar well known polymerizable ethenoid monomers.

In some cases, it may be desirable to use the vinyl pyridine as modifier itself and the vinyl pyridines which are suitable include both the unsubstituted vinyl pyridines such as 2-vinyl pyridine and 4-vinyl pyridine as well as the substituted vinyl pyridines having one or more lower alkyl groups in the 2, 4 or 6 positions on the ring. The copolymers of these or similar vinyl pyridines with an acrylamide such as N-methyl methacrylamide or N-isopropyl acrylamide are particularly useful, desirably as the preformed live or dead polymer.

These latter polymers when grafted with chloride component are characterized by an unusual degree of light fastness when dyed with any of the common textile dyes.

The exact reason for the greatly improved solubility characteristics of the graft polymers prepared in accordance with this invention is not clearly apparent but such improved properties would appear to be a function of the unusual uniformity of the polymer from the standpoint both of composition distribution and molecular weight distribution. Although the preferred polymers are soluble in acetone at room temperature, the invention is not limited to acetone-soluble polymers since improved solubility in other well known solvents such as N,N-dimethyl formamide, N,N-dimethyl acetamide, γ-butyrolactone, alcohols, aromatic hydrocarbons and the like characterizes the products produced in accordance with the invention. Thus, for example, spinning dopes may be used wherein the solvent is a mixture of such materials as acetone and an alkyl alcohol with excellent results.

The polymers prepared in accordance with the invention are of particular utility for the manufacture of textile fibers, but such polymers also find utility in the manufacture of cast or extruded sheets, films, ribbons, etc. In film form, the polymers can be employed in photographic applications such as for film base for carrying photosensitive emulsions, such as silver halide emulsions, and such use can be in the manufacture of either black-and-white or color photographic film. Because of their excellent compatibility, the graft polymers of the invention can be used in mechanical mixtures with other polymeric materials to give improved solubility and dyeability characteristics.

In commercial practice, of course, it is desirable to carry out the process for prolonged periods of time with continuous withdrawal of product and best results are obtained by carrying the reaction forward beyond the initial contact time. In some cases, however, when employing large volume equipment or preparing relatively small batches of polymer, it may be desirable to stop the polymerization when the reactor capacity is reached, and this can be done with somewhat less advantageous results, particularly when the contact time is such that the conversion is substantially complete. In addition to the improved solubility characteristics of the products derived by means of the invention, certain other advantages are present in the continuous process as described. The process can be run with a completely filled system whereby all traces of oxygen are eliminated. Furthermore, the induction period and non-reproducibility of rate of reaction, polymer inherent viscosity, polymer molecular weight distribution, and similar variable factors are also eliminated. Since only a relatively small quantity of monomer is polymerizing at any time, the heat of reaction can be readily dissipated. Consequently, faster rates can be used and the temperature can be controlled within narrow limits so as to obviate variable reaction rates or precipitation of polymer due to inverse solubility. Thus, the graft polymer product has a uniform composition distribution and is free of ungrafted precipitated particles. Thus, by means of this invention, the disadvantages inherent in processes employed prior to this invention are largely obviated. Typical polymers which are readily produced in accordance with this invention employing the continuous process as described are any of the polymers described in the copending Coover applications Serial Nos. 471,501, 471,502 and 471,503 referred to hereinabove and filed concurrently herewith.

Although the invention has been described in detail with particular reference to certain preferred embodiments thereof, variations and modifications can be effected within the spirit and scope of the invention as described hereinabove and as defined in the appended claims.

We claim:
1. In the process of producing graft copolymer by polymerizing an admixture of monoethylenically unsaturated polymerizable monomeric material (A) and an aqueous dispersion of a preformed polymer of monoethylenically unsaturated polymerizable monomeric material (B) in the presence of a peroxy polymerization catalyst for monoethylenically unsaturated polymerizable monomeric material, the improvement which comprises producing a graft copolymer of improved solubility characteristics by continuously and progressively bringing together at a constant ratio (1) said monomeric material (A), (2) said aqueous dispersion of preformed polymer of said monomeric material (B), and (3) said polymerization catalyst, said monomeric material (A) and said preformed polymer of monomeric material (B) being brought together in a constant ratio within the range of 60–95% by weight of said monomeric material (A) and conversely 40–5% by weight of said preformed polymer, both based on the combined weight of said monomeric material (A) and said preformed polymer, maintaining each portion of the resulting polymerizable mixture at a substantially constant temperature in the range of 15–75° C. for a substantially equal time, and continuously and progressively withdrawing the resulting polymerized mixture at a substantially constant rate equivalent to the rate of bringing together of (1), (2) and (3), said continuous and progressive bringing together of (1), (2) and (3) and said continuous and progressive withdrawing being continued at a constant rate throughout the polymerization whereby the composition of the mixture being polymerized remains substantially unchanged during the polymerization, from 25 to 65% by weight of said monomeric material (A) being vinylidene chloride and at least 50% by weight of said monomeric material (B) having the formula

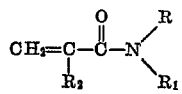

wherein R and $R_1$ each represents a member selected from the group consisting of a hydrogen atom and an alkyl group of from 1 to 4 carbon atoms, and $R_2$ represents a member selected from the group consisting of a hydrogen atom and a methyl group.

2. The process according to claim 1 wherein the monomeric material (A) consists of 30–65% by weight of vinylidene chloride and 70–35% by weight of acrylonitrile, the monomeric material (B) consists of 50–99% by weight of N-isopropylacrylamide and 50–1% by weight of 2-methyl-5-vinyl pyridine, and the percent conversion to acetone-soluble, non-inflammable, fiber-forming graft copolymer is at least 70%.

3. The process according to claim 1 wherein the monomeric material (A) consists of 30–56% by weight of vinylidene chloride and 70–35% by weight of acrylonitrile, the preformed polymer is a polymer of N-methyl methacrylamide, and the percent conversion to acetone-soluble, non-inflammable, fiber-forming graft copolymer is at least 70%.

4. The process according to claim 1 wherein the monomeric material (A) consists of 30–65% by weight of vinylidene chloride and 70–35% by weight of acrylonitrile, the preformed polymer is a polymer of N-isopropyl acrylamide, and the percent conversion to acetone-soluble, non-inflammable, fiber-forming graft copolymer is at least 70%.

References Cited in the file of this patent
UNITED STATES PATENTS

| 2,470,908 | Baer | May 24, 1949 |
| 2,614,089 | Harrison et al. | Oct. 14, 1952 |
| 2,666,025 | Nozaki | Jan. 12, 1954 |
| 2,666,042 | Nozaki | Jan. 12, 1954 |

FOREIGN PATENTS

| 627,265 | Great Britain | Aug. 4, 1949 |
| 690,937 | Great Britain | Apr. 29, 1953 |
| 694,408 | Great Britain | July 22, 1953 |
| 999,594 | France | Oct. 3, 1951 |

UNITED STATES PATENT OFFICE

CERTIFICATE OF CORRECTION

Patent No. 2,879,256 March 24, 1959

Willis C. Wooten, Jr., et al.

It is hereby certified that error appears in the printed specification of the above numbered patent requiring correction and that the said Letters Patent should read as corrected below.

Column 14, line 15, for "30-56%" read -- 30-65% --.

Signed and sealed this 28th day of July 1959.

(SEAL)
Attest:

KARL H. AXLINE
Attesting Officer

ROBERT C. WATSON
Commissioner of Patents